United States Patent [19]

Buss et al.

[11] Patent Number: 5,539,395
[45] Date of Patent: Jul. 23, 1996

[54] LOCATION DEPENDENT INFORMATION RECEIVING DEVICE AND METHOD

[75] Inventors: Thomas E. Buss, Wellington; Michael J. DeLuca, Boca Raton, both of Fla.

[73] Assignee: Motorola, Inc., Schaumburg, Ill.

[21] Appl. No.: 496,865

[22] Filed: Jun. 30, 1995

Related U.S. Application Data

[63] Continuation of Ser. No. 143,966, Nov. 1, 1993, abandoned.

[51] Int. Cl.⁶ .............................. H04B 3/38; H04Q 7/00
[52] U.S. Cl. ................................. 340/827; 340/825.440; 340/825.470; 455/38.100
[58] Field of Search ........................ 340/827, 825.26, 340/825.27, 825.44, 825.47, 311.1, 905, 825.36, 825.49; 370/94.1; 379/57; 455/38.1, 18, 66; 369/7; 381/2

[56] References Cited

U.S. PATENT DOCUMENTS

| | | | |
|---|---|---|---|
| 3,984,807 | 10/1976 | Haemming | 340/825.49 |
| 4,644,351 | 2/1987 | Zabarsky et al. | 340/825.44 |
| 4,725,886 | 2/1988 | Galumbeck et al. | 340/825.47 |
| 4,812,843 | 3/1989 | Champion III et al. | 340/905 |
| 4,845,491 | 7/1989 | Fascenda et al. | 340/825.27 |
| 4,916,539 | 4/1990 | Galumbeck | 340/825.47 |
| 4,973,952 | 11/1990 | Malec et al. | 340/825.49 |
| 5,133,081 | 7/1992 | Mayo . | |
| 5,196,842 | 3/1993 | Gomez et al. | 340/311.1 |
| 5,254,986 | 10/1993 | DeLuca | 340/825.44 |
| 5,274,845 | 12/1993 | Wang | 340/825.49 |
| 5,317,311 | 5/1994 | Martell et al. | 340/905 |
| 5,406,271 | 4/1995 | Sonnendorfer et al. | 340/825.36 |

*Primary Examiner*—Michael Horabik
*Assistant Examiner*—Edward Merz

[57] ABSTRACT

A portable device (55) has a first receiver (62) for receiving a paging signal (40–52) from a paging system (10). A second receiver (72) receives area identification signals (20–26) from a second system. The received paging signals may be stored in a memory (80) for later retrieval. A controller (75) examines the paging signals (40–52) and selects messages having a location signal (44, 50) matching a location of the device (55). The address of the device (66) may also be used to select the messages. Upon selection, an alert is generated by an alert means (82) and the message is annunciated on a display (84).

19 Claims, 4 Drawing Sheets

LOCATION DEPENDENT INFORMATION RECEIVING DEVICE AND METHOD

This is a continuation of application Ser. No. 08/143,966 filed Nov. 1, 1993, now abandoned.

FIELD OF THE INVENTION

This invention relates generally to the field of information receiving portable devices which use a determined location for presentation of information.

BACKGROUND OF THE INVENTION

With the advent of information services for portable receiving devices such as pagers, a user may carry an information device capable of receiving and accessing a large volume of data. Additionally, with improved memory capability of pagers, a large volume of messages may be stored in the pager. Sorting through such a large volume of messages to find information relevant to the user may pose a tedious task for the pager user.

Additionally, the recent introduction of information services provides a new method of communicating a large amount of information to a large number of people at a relatively low cost. However, information may be relevant only to a user who either has entered or is about to enter a certain location, and not relevant when the user is located elsewhere.

Thus, what is needed is a device and method for selecting relevant information from the large amount of communicated information on the basis of an intended location of the user.

SUMMARY OF THE INVENTION

A location dependent message presentation device comprises a first receiver for receiving a messaging signal transmitted by a first communication system to a multiplicity of areas. The messaging signal including a multiplicity of messages having a location signal associated therewith. The device further includes a location determining means for determining a location of the device and a control means coupled to the receiver and the location determining means for selecting a message from the multiplicity of messages, the message having a location signal corresponding to the location of the device.

DETAILED DESCRIPTION OF THE INVENTION

Figure 1:
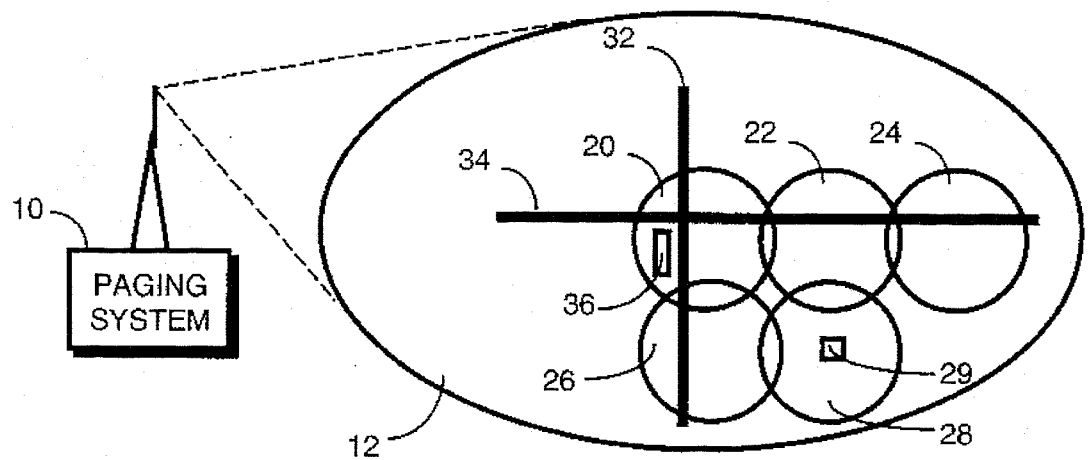
FIG. 1 shows a paging system having an information service which transmits a messaging signal within a coverage area divided into a multiplicity of areas by a second system in accordance with the preferred embodiment of the present invention.

FIG. 1 shows a paging system having information service which transmits a messaging signal within a coverage area divided into a multiplicity of areas by a second system in accordance with the preferred embodiment of the present invention. A paging system, 10, comprises a number of transmitters for transmitting messages within a large coverage region or area 12. A typical paging system may have a coverage area 12 which exceeds one thousand square miles or two thousand square kilometers. Also transmitting within the coverage area is a second system capable of identifying a multiplicity of areas 20, 22, 24, 26 and 28 substantially smaller than the coverage area 12. The second system may be any of a number of systems capable of indicating location in a particular area. Such systems include the global positioning system (GPS) capable of identifying a location within thirty yards or meters, portable telephone systems providing area identification signals such as the cellular telephone system or the personal communication system (PCS), or other highway location systems such as a system described in U.S. Pat. No. 5,133,081. In a preferred highway location system, each area 28 has a local base station 29 for transmitting an area identification signal within the area. FIG. 1 also shows an intersection of two streets, Northsouth street 32 and Eastwest street 34. At the intersection of the two streets is a location of interest 36. The location may correspond to a retail outlet, service center or residence of the user of the device.

Figure 2:
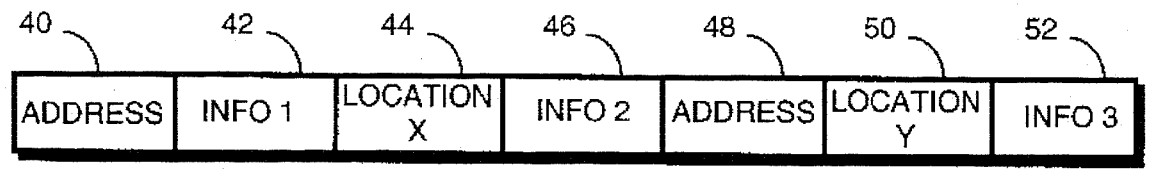
FIG. 2 shows an example of a messaging signal transmitted by the paging system of the preferred embodiment of the present invention.

FIG. 2 shows an example of a messaging signal transmitted by the paging system of the preferred embodiment of the present invention. A first message signal consists of a typical selective call message having an address 40 followed by first message information 42. A second message signal consists of a location signal 44 followed by second message information 46. A third message signal consists of an address 48 followed by a location signal 50 and third message information 52. Note that the third message may have the location signal 50 and address 48 occur in reverse order. Furthermore, the address, 40 and 48, may consist of more than one portion, there by allowing sub-addressing of paging receivers in a manner known to those familiar with the art. Also, the location signals 44 and 50 may indicate a plurality of locations in which the message is to be received. In the preferred embodiment, the messaging signal is carried upon the POCSAG protocol, a well known paging protocol which provides for Doth selective call messaging and information service messaging. Alternately, different paging protocols may be used, one such paging protocol providing for improved information services is the Motorola Flex™ paging protocol.

Figure 3:
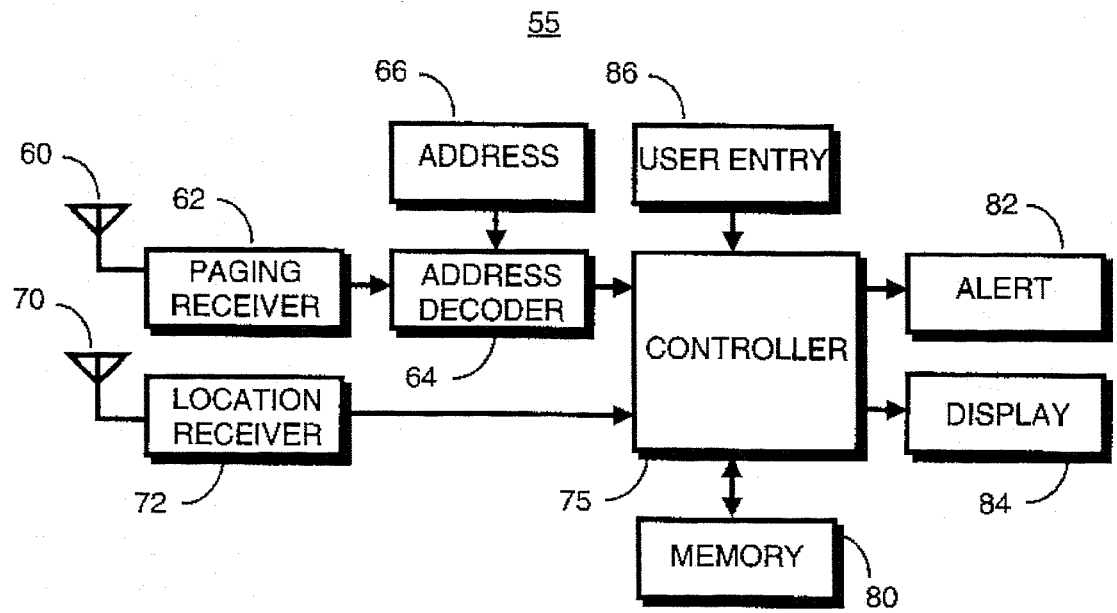
FIG. 3 shows a block diagram of a location dependent message display device operating in accordance with the preferred embodiment of the present invention.

FIG. 3 shows a block diagram of a location dependent message display device 55 operating in accordance with the preferred embodiment of the present invention. The messaging signal of FIG. 2 is received at the device by an antenna 60, demodulated by receiver 62, and an address decoder 64 searches each message for a predetermined address 66 assigned to the receiver. Device 55 also has a second antenna 70, which may be common to antenna 60, for receiving an area identification signal transmitted by the second system. Antenna 70 is coupled to location receiver 72 which demodulates and processes the area identification signal. Receivers 72 and 62 may share elements and need not be independent of each other. Controller 75 receives the messaging signal and the results determined by the address decoder 64 as well as the area identification signals from the location receiver 72. The message signals may be stored in optional memory 80 for later retrieval. Upon reception of a message an alert may be generated on alert generator 82 which is preferably a combination of an audio speaker, a lamp and an icon on display 84 which can operate in any of a number alert modes known for use with paging receivers. Then, the message may be annunciated on a message annunciator, which is preferably a display 84 for displaying displayable message information. In alternate embodiments, the annunciating means may be a speaker for annunciating audible message information. User entry means 86 preferably consists of a plurality of buttons for controlling the operation of the device 55. Such operational control includes operating display 84, resetting an alert generated on alert means 82, inhibiting detection of a location detection mode and entry of a path upon which the user may travel.

Figure 4:
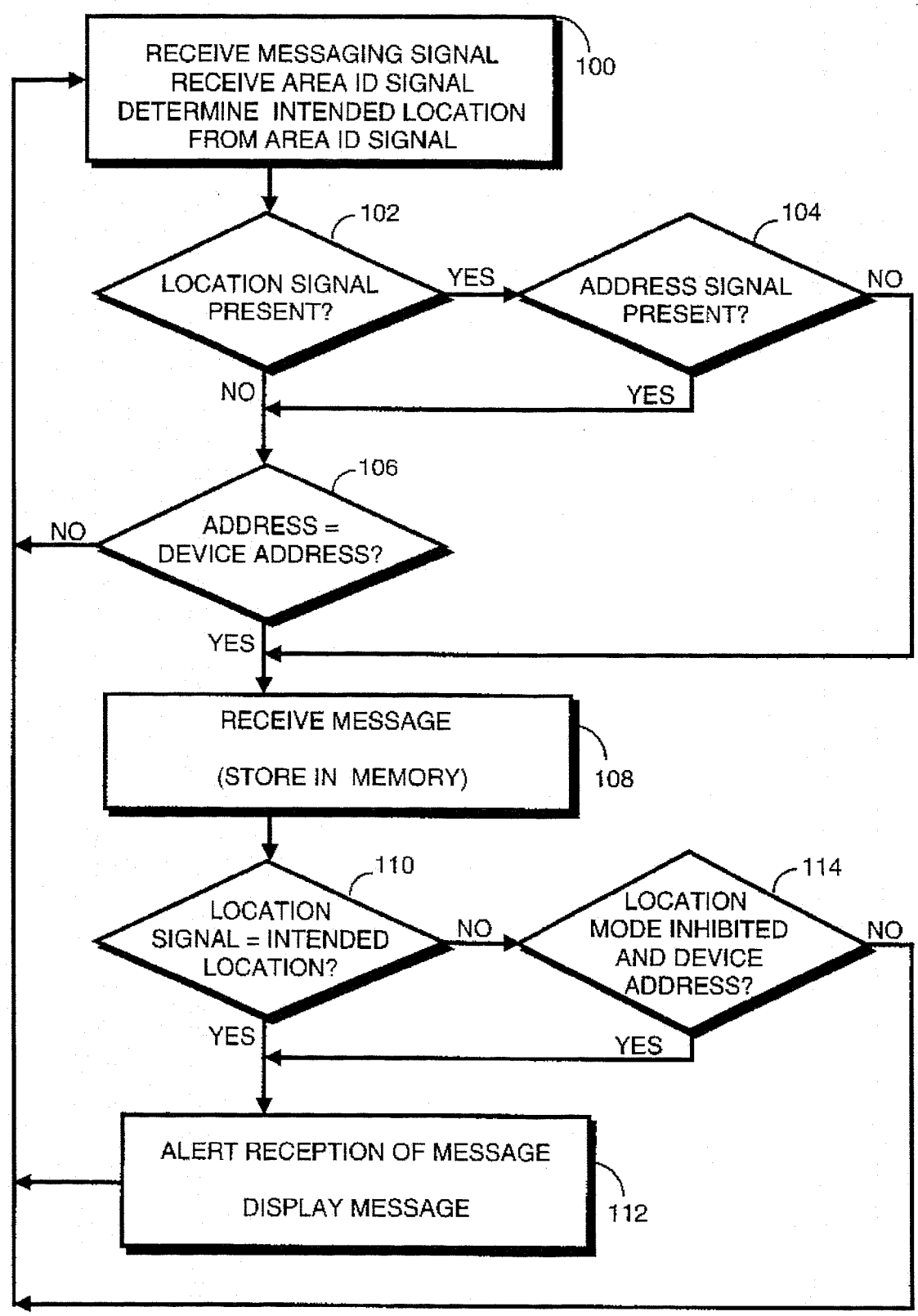
FIG. 4 shows a flowchart of the device while receiving the messaging signal and the area identification signal in accordance with the preferred embodiment of the present invention.

FIG. 4 shows a flowchart of the device while receiving the messaging signal and the area identification signal in accordance with the preferred embodiment of the present invention. In step 100, the messaging signal is received by paging receiver 62, and the area identification signal is received by location receiver 72, then an intended location is derived from the area identification signal. Steps for deriving the intended location from the received area identification signal are described by FIG. 6. In step 102, each message is examined for the presence of a location signal such as location signals 44 and 50 of FIG. 2. If a location signal is present, then step 104 examines the received message for the presence of an address signal, such as addresses signals 40 and 48 of FIG. 2. If an address signal is present, then address decoder 64 determines if the address signal matches the predetermined device address 66. If there is no match, step 100 is returned to. However, if there is either a matching address or if there is location signal, then in step 108, the remainder of the message signal is received and the message signal is optionally stored in optional memory 80. After reception of the message, the location signal of the message (if any) is examined to determine if it matches the intended location at step 110. If there is a match, or if there is no location signal (but the address signal matches the address of the device from step 100), then the reception of the message is alerted and the message is displayed in step 112. If the location signal of the message is different from the intended location at step 110, then step 114 checks if the location mode is inhibited and the device's address is present. If true, step 114 causes the message to be alerted and displayed in step 112, otherwise, the message is ignored and step 100 is returned to.

FIG. 4 shows that messages of the messaging signal will be alerted and displayed if the location signal of the message matches the intended location of the device. This corresponds to the second message signal 44 and 46 of FIG. 2. This provides the user with the advantage of eliminating the need to sort through the reception of all of the location dependent messages transmitted by the paging system which may or may not be relevant to the user. Only messages relevant to the intended location of the user are alerted or displayed to the user. For example, if location of interest 36 was a one of a chain of retail department stores, and the user of the device was in the vicinity of the store 36, then device 55 could determine its proximity to the store 36 by receiving the area identification signal transmitted in area 20 and determining its intended area to include the location signal indicating store 36. The information portion of the message could contain advertising information relevant to the store. The device user would be alerted to the information while in the vicinity of the store 36 thereby making the purchase of the items convenient. Furthermore, with the advent of high speed paging protocols such as Motorola's Flex™ protocol providing for low cost communication of large amounts of information over a large area, the department store may avail itself of low cost advertising limited to potential customers in the vicinity of a store. Also, since the location signal may indicate several locations for reception of the message, if the store is a member of a chain of stores within the coverage area 12, all having identical advertising, the location signal 44 may indicate each store's location, and the information 46 may be received by devices located in the vicinity of each of the stores by a single transmission of the advertisement by the paging system. Thus, the invention also provides an advantageous form of message communication for the message sender.

FIG. 4 also shows that a message signal may only be alerted and displayed if both the intended location of the device matches the location signal and the address of the device matches the predetermined address of the device. This corresponds to the third message signal of FIG. 2 having an address signal 48, a location signal 50 as well as message information 52. This aspect realizes the advantage of further reducing the amount of sorting of information services messages of the message system by the user. For example, the address could be associated with a particular purchasing habit of the user. If the user owned a German manufactured automobile and regularly purchases automobile services, the address could be indicative of group of German automobiles owners, and store 36 could correspond to a company which services German automobiles. In this example, only users the vicinity of the German car repair store would receive advertising information regarding special service rates for German cars. This reduces the amount of information which the user sorts through in order to find information relevant to the user, because the information is specific to the user and related to the vicinity in which the user intends to be.

FIG. 4 also shows that in step 114, the vicinity restriction may be inhibited and all messages having the user's device address will be alerted and displayed. This allows all messages directed to the user to be received by the user independent of the location signal and thus the location of the user. Further, FIG. 4 also provides for operation of the device as a normal selective call receiver for receiving an individual message such as the first message 40 and 42 of FIG. 2.

From a second perspective, the location signals 44 and 50 of FIG. 2 may be considered as another form of a paging address or sub-address. From this perspective, the signals of the second system 20–28 operate to change the address of the pager 55. Thus, the pager 55 receives an area identification signal from a second radio frequency communication system, determines an address signal in response to the signal, receives either a single address portion 44, or a combination of addresses or address and a sub-address as shown by 48 combined with 50. Pager 55 then indicates the reception of the message if the address portion matches the address signal. Furthermore, the paging system 10 has a new way of communicating messages within a large area 12 for reception in individual smaller areas, such as predetermined area 20. In this case, the communication system determines at least one predetermined location for reception of the information portion, the location may be indicated by the sender to be predetermined area 20 near point of interest 36. The paging system then assigns a signal indicative of the predetermined location and transmits the message signal in area 12 which is substantially larger than the predetermined location 20.

Figure 5:
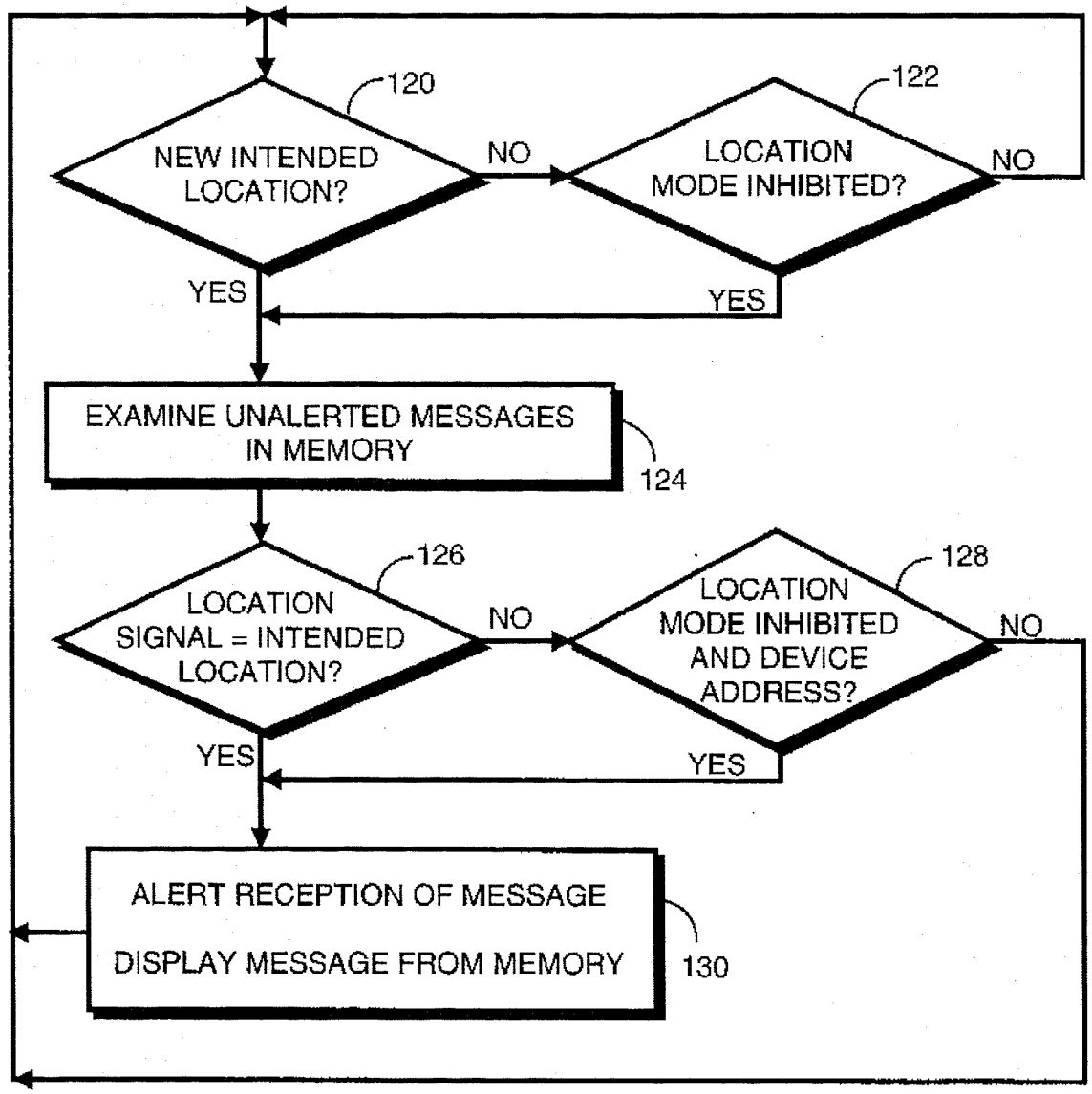
FIG. 5 shows a flowchart for alerting messages stored in optional memory in response to a change in intended location in accordance with a second embodiment of the present invention.

FIG. 5 shows a flowchart for alerting messages stored in optional memory 80 in response to a change in intended location in accordance with a second embodiment of the present invention. The operation of FIG. 5 is an optional operation because substantially more memory may be required than is currently marketable in a conventional paging device, but anticipates its future practicality. Step 120 determines if a new intended location has been determined. Determination of intended location is described by FIG. 6. If the intended location remains unchanged, then step 122 determines if the location mode has been inhibited. If not inhibited, step 120 is returned to. If either a new intended location has been determined or the location mode inhibited, the memory 80 is examined for unalerted messages, that is messages that were received and stored in step 108 yet not alerted by step 112. In alternate embodiments, the unalerted requirement of step 124 may be modified or eliminated. Then, step 126 determines which unalerted messages have a location signal matching the intended location or, if the location mode is inhibited, step 128 determines which unalerted messages have an address signal matching the device address. If the result of either step 126 or 128 is true, then each identified message is alerted and displayed in step 130. Otherwise, step 130 is skipped and step 120 is returned to.

FIG. 5 shows alerting and displaying a message previously received by the device and stored in memory in response to the device having a new intended location. This aspect of the invention has the advantage of allowing for transmission of a message signal when the user in not in a desired vicinity and alerting and display of the message when the user enters the desired vicinity. For example, a user may pass through the vicinity of store 36 in a short time, two minutes for example. By first receiving and storing the message before the user enters the vicinity of the store and then alerting it when the user is in the vicinity, the message need not be transmitted during the two minutes while the user is physically in the vicinity of store 36. This aspect has the advantage of allowing the message signal to be transmitted at any time prior to the user's entry to the vicinity of the store. This allows the message to be transmitted during times when the paging system is lightly loaded, at night time for example, and should further reduce the cost of the transmission of the message signal. Furthermore, the user is assured that the information will be alerted while the user is in the vicinity of the store, even though the message signal was not transmitted then.

FIG. 5 also allows for inhibiting the location signal and detection, alerting and displaying messages having an address matching the device address independent of the location signal. As previously discussed, this allows the user to examine all messages directed at the user with different location signals.

Figure 6:
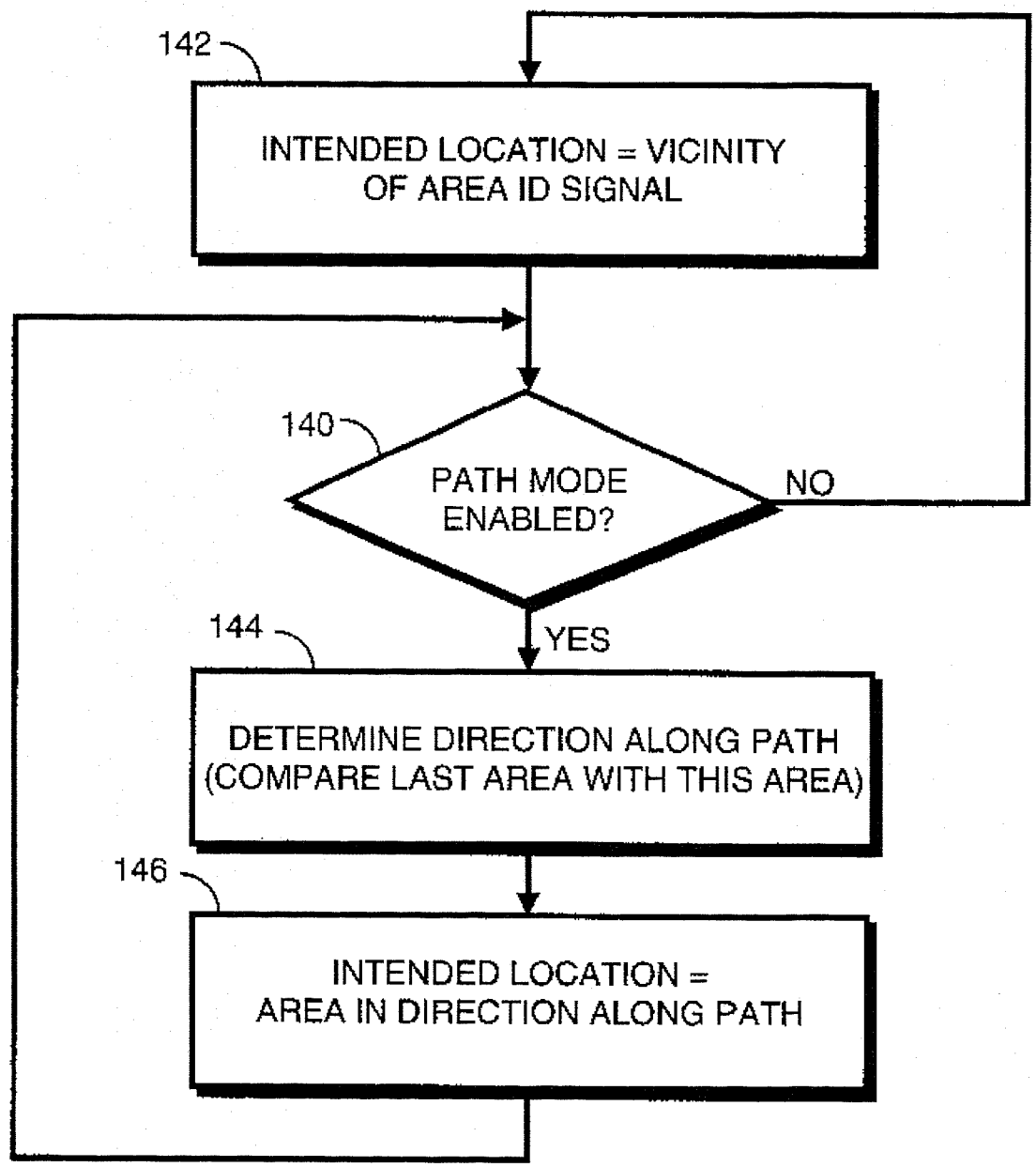
FIG. 6 shows a flowchart for determining the intended location of the device in accordance with the preferred embodiment of the present invention.

FIG. 6 shows a flowchart for determining the intended location of the device in accordance with the preferred embodiment of the present invention. Beginning at step 140, if the path mode is not enabled, step 142 sets the intended location to the vicinity of the area identification signal received by location receiver 72. This may be accomplished in a variety of ways. If the second location system is a global positioning system (GPS), then the latitude and longitude of the device can be ascertained from the GPS area identification signal and the intended location be a predetermined vicinity, such as any location within a quarter mile or a third of a kilometer of the device. In which case the location signals 44 and 50 could also contain latitude and longitude coordinates for analysis by controller 75. If the cellular or PCS telephone or the highway location system were used, then the intended location could correspond to cell in which the area identification signal was received, or expanded to include a predetermined number of cells in the surrounding vicinity. In this case, the location signal of FIG. 2 could correspond to an address signal identifying a cell of the system.

If the path mode is enabled, step 140 proceeds to step 144 to determine the direction along the path. The path mode may be enabled or disabled by a user selection via switches 86. As an example, if the user's normal path from employment at a location within area 24 along Eastwest street 34 to a residence located in area 26 off of Northsouth street 32, then the intended path begins at area 24 and goes along Eastwest street 34 through areas 22 and 20, to the intersection of Eastwest street 34 and Northsouth street 32, and along Northsouth street to the residence in area 26. The user may enter the above described path into the device using user entry switches 86, or by down-loading data from a personal computer to the device through a data interface (not shown) to the controller. Step 144 determines the direction along the path by determining a change from area 24 to area 22. Alternately, if the path mode was entered with the device at a path's end point, such as area 24, then the direction may be automatically determined to be in the only possible direction along the path, areas 24, 22, 20 then 26. After determining the direction, then step 146 determines the intended location to be the area in the determined direction along the path. In the above example, the direction was determined in area 22 and the direction of the path would include areas 22, 20, and 26, thus the intended location would correspond to areas 22, 20 and 26. If the path were long, the intended location can be limited to number of areas along the path which the user is expected to encounter within a predetermined amount of time or distance. For example, the intended area could be limited to areas 22 and 20 while the device in located in area 22. Since location of interest 36 is within the area of interest, the message corresponding to location 36 would be alerted and displayed as described with respect to FIGS. 4 and 5 before the device and its user are in the vicinity of location of interest 36. This aspect of the invention allows the user to plan a response to the message signal regarding the area of interest 36 before arrival in its vicinity.

Furthermore, area 24, while on the path is not a member of the intended location because it does not lie along the direction of the path from area 22 to area 26. This has the advantage of sparing the user from sorting through messages intended for a location in area 24, or locations which the user has already passed. An advantageous example of information for use in path mode is traffic conditions. This mode allows the user to be alerted to unusual traffic conditions along the predetermined path in advance of arrival of the traffic condition. If the message signal indicated the occurrence of a traffic accident blocking the intersection of Eastwest street and Northsouth street, then the user could plan an alternate route of travel in advance of encountering the accident. Other traffic information, even though transmitted by the paging system 10 and received and stored by the device 55, would not be presented to the user because the device 55 is able to sort through and determine the relevancy of the information based upon the location or intended location of the user. Alternately, the intended location could correspond to both directions along the path, and may further be limited only to areas which the device may determine the user is likely to enter within a predetermined time or distance.

Thus, what is provided is a device and method for selecting from the large amount of information on the basis of an intended location of the user.

What is claimed is:

1. A location dependent message presentation device comprising:

a first receiver for receiving a messaging signal transmitted by a first communication system to a coverage region comprised of a multiplicity of substantially smaller areas, the messaging signal including a multiplicity of messages having a location signal associated therewith;

a location determining means for determining independently of the messaging signal a location of the device, said location determining means including a second receiver for receiving an area identification signal transmitted by a second communication system for transmitting area identification signals indicative of each of the multiplicity of areas; and a control means coupled to said first receiver and said location determining means for selecting a message of the multiplicity of messages having a location signal corresponding to the location of the device.

2. The device according to claim 1 wherein the second communication system corresponds to a personal communication system.

3. The device according to claim 1 wherein the second communication system corresponds to a global positioning system.

4. The device according to claim 1 wherein each location signal corresponds to at least one of the areas.

5. The device according to claim 1 wherein the multiplicity of messages further includes a plurality of messages, each of the plurality of messages an having an address signal indicative of at least one selective call receiver, and the device comprises a selective call receiving device having a predetermined address, and the device further comprises:

an address decoding means for identifying the message from the plurality of messages if the message has an address signal matching the predetermined address; and wherein said control means is further coupled to said address decoding means for selecting the message in response to both the location of the device signal corresponding to the intended location of the device and the address signal corresponding to the predetermined address.

6. The device according to claim 5 further comprising:

a manual input means for inhibiting operation of said location determining means; and wherein said control means selects the message in response to the address signal matching the predetermined address of the device and not the location signal corresponding to the intended location.

7. The device according to claim 1 wherein said control means determines a path of movement of the device and the location of the device corresponds to a plurality of locations along the path of movement of the device.

8. The device according to claim 1 further comprising:

a manual input means for allowing a user to input the path of movement of the device, and wherein said location determination means determines the location of the device to be substantially equal to a plurality of locations along the path of movement of the device in which the device anticipates to be located.

9. The device according to claim 1 further comprising:

a memory means coupled to said first receiver for storing the multiplicity of messages, and wherein said control means, being further coupled to said memory means, selects the message from said memory means.

10. The device according to claim 1 further comprising an alerting means coupled to said control means for generating an alert in response to said control means selecting the message.

11. The device according to claim 1 further comprising an annunciating means coupled to said control means for annunciating the message.

12. The device according to claim 11 wherein the message includes displayable information, and said annunciating means includes a display for displaying the displayable information.

13. The device according to claim 11 wherein the message includes audible information, and said annunciating means includes a speaker for converting the audible information into sound.

14. A location dependent message presentation method comprising the steps of:

(a) receiving a messaging signal transmitted by a first communication system to a coverage region comprised of a multiplicity of substantially smaller areas, the messaging signal including a multiplicity of messages having a location signal associated therewith;

(b) determining independently of the messaging signal a location of the device including receiving an area identification signal transmitted by a second communication system for transmitting area identification signals indicative of each of the multiplicity of areas; and (c) selecting a message of the multiplicity of messages having a location signal corresponding to the location of the device.

15. The method according to claim 14 further comprising the steps of:

(d) storing the multiplicity of messages in a memory; and (e) selecting a message from the memory.

16. The method according to claim 14 wherein the multiplicity of messages include a plurality of messages, each of the plurality of messages having an address signal associated therewith, and the method further comprises the step of:

(f) identifying the message from the plurality of messages if the message has an address signal matching a predetermined address; and wherein said step (c) of selecting further includes the step of selecting the message in response to both the location signal corresponding to the intended location and in response to said step (g) of identifying.

17. A location dependent message presentation device comprising:

a first receiver for receiving a messaging signal transmitted by a first communication system to a multiplicity of areas, the messaging signal including a multiplicity of messages having a location signal and an address signal associated therewith;

a location determining means for determining independently of the messaging signal a location of the device, said location determining means having a second receiver for receiving an area identification signal transmitted by a second communication system for transmitting a multiplicity of area identification signals within the multiplicity of areas, each of the multiplicity of area identification signals being indicative of a predetermined one of the areas wherein the location corresponds to one of the area identification signals;

a memory means for storing the multiplicity of messages;

an address decoder for identifying a message from the multiplicity of messages if the address signal of the message matches a predetermined address;

a control means coupled to said first receiver, said address decoder, and said location determining means for selecting the message if the location signal of the message corresponds to the location of the device and the address signal of the message corresponds to the predetermined address;

an alerting means coupled to said control means for generating an alert in response to said control means selecting the message; and an annunciating means coupled to said control means for annunciating the message.

18. In a selective call receiver, a method of selectively receiving a message transmitted within a first area by a first radio frequency communication system, the message having an address portion indicative of a predetermined area within the first area, the method comprising the steps of:

(a) receiving a signal from a second radio frequency communication system, the signal indicative of a second area within the first area;

(b) determining an address signal in response to the signal, the address signal being indicative of a location of the device;

(c) receiving the address portion; and (d) producing a reception signal indicative of a reception of the message if the address portion matches the address signal and the predetermined location is within the intended area.

19. A selective call receiver for receiving messages within a coverage area, comprising:

a first receiver for receiving an area identification signal transmitted by a system for transmitting one of a multiplicity of area identification signals to each of a multiplicity of areas within the coverage region, each of the areas being relatively smaller than the coverage region;

a second receiver for receiving a messaging signal transmitted to the coverage region, the messaging signal carrying a multiplicity of messages, a location portion of at least one of the multiplicity of messages containing information associated with at least one of the multiplicity of areas; and means coupled to the first receiver and to the second receiver for displaying at least one of the messages carried by the messaging signal in response to the location portion of the at least one of the messages and in response a received area identification signal.

* * * * *

UNITED STATES PATENT AND TRADEMARK OFFICE
CERTIFICATE OF CORRECTION

PATENT NO. : 5,539,395
DATED : July 23, 1996
INVENTOR(S) : Buss et al.

It is certified that error appears in the above-indentified patent and that said Letters Patent is hereby corrected as shown below:

Column 7, Claim 5, Line 54, delete "intended".

Column 7, Claim 6, Line 63, delete "intended".

Column 7, Claim 6, Line 63, after location insert -- of the device--.

Column 7, Claim 5, Line 53, delete "of the device".

Signed and Sealed this

Twenty-fourth Day of December, 1996

Attest:

BRUCE LEHMAN

Attesting Officer     Commissioner of Patents and Trademarks